United States Patent [19]

Adler et al.

[11] Patent Number: 5,713,332

[45] Date of Patent: Feb. 3, 1998

[54] METHOD FOR CONTROLLING PROCESSES IN A MOTOR VEHICLE

[75] Inventors: Walter Adler, Gernsheim; Manfred Schmitt, Heppenheim; Henning Tolle, Rossdorf; Thorsten Ullrich, Gernsheim, all of Germany

[73] Assignee: Robert Bosch GmbH, Stuttgart, Germany

[21] Appl. No.: 718,329

[22] PCT Filed: May 26, 1995

[86] PCT No.: PCT/DE95/00689

§ 371 Date: Sep. 25, 1996

§ 102(e) Date: Sep. 25, 1996

[87] PCT Pub. No.: WO95/33132

PCT Pub. Date: Dec. 7, 1995

[30] Foreign Application Priority Data

May 28, 1994 [DE] Germany .................. 44 18 731.9

[51] Int. Cl.$^6$ .................. F02D 41/14; F02D 41/26; F02D 43/04

[52] U.S. Cl. .................. 123/417; 123/486; 123/674; 180/197; 364/424.088; 364/431.052

[58] Field of Search .................. 123/417, 480, 123/486, 674, 675; 180/197; 364/424.084, 424.085, 424.088, 431.052, 431.053, 431.062; 477/121, 138

[56] References Cited

U.S. PATENT DOCUMENTS

| | | | |
|---|---|---|---|
| 4,676,215 | 6/1987 | Blocher et al. | 123/674 X |
| 4,827,937 | 5/1989 | Kohler et al. | 123/486 |
| 4,862,855 | 9/1989 | Manaka et al. | 123/674 |
| 4,901,240 | 2/1990 | Schmidt et al. | 123/674 X |
| 5,023,794 | 6/1991 | Klenk | 123/486 X |
| 5,065,726 | 11/1991 | Klenk | 123/486 X |
| 5,079,691 | 1/1992 | Heck et al. | 123/480 X |

*Primary Examiner*—Tony M. Argenbright
*Attorney, Agent, or Firm*—Kenyon & Kenyon

[57] ABSTRACT

A method for controlling processes in a motor vehicle is intended, for example, for open-loop/closed-loop control of combustion processes, transmission switching processes or braking processes. An engine characteristics map is formed by operating quantities of the respective process and is represented by a number of support points. In the corresponding control unit, for each support point a piece of information about the value of the map at the position of the support point is provided. In the open-loop/closed-loop control of the process, for a determined working point of the process at least one map value that is decisive for this working point is determined from the map and taking account of this, at least one control quantity for the emission of a control signal is formed. The map is automatically adapted to a changed process behavior. For the adaptation, a correction value is determined for a certain operating phase of the map. According to the present invention, additionally for each support point a piece of information about the position of the support point within the map is provided so that the support points are enterable independent of a fixed grid into the map. For adaptation of the map, a number of support points of the map lying around the determined correction value is chosen. These support points are then adapted, the support point correction being carried out distance-weighted with reference to the position of the determined correction value within the map.

33 Claims, 8 Drawing Sheets

METHOD FOR CONTROLLING PROCESSES IN A MOTOR VEHICLE

FIELD OF THE INVENTION

The present invention relates to a method for controlling processes in a motor vehicle.

BACKGROUND INFORMATION

A method for controlling processes in a motor vehicle is shown in German Patent Application No. 34 08 215. The methods described therefrom are intended particularly for controlling the A/F control, knock control, ignition point control, injection control, boost pressure control or even idle control.

In the method of the German Patent Application described above, a precontrol of the operating quantities to be controlled is effected using an engine characteristics map stored in the memory of the control unit. The map is represented by a number of support points present in the memory. Using a superimposed controlling means, the deviation of the map value read out for a working point to an optimal setpoint value is determined. The map is adapted based on the determined deviations. For this purpose, a region around the support point is defined per support point as the pull-in region of the support point. As long as the working point stays in a pull-in region of a support point, for each map access the deviation of the determined map value at the position of the working point from a specified desired function curve is determined. The determined deviations are averaged. After the working point has left the pull-in region of the support point, the support point of the pull-in region is corrected by the averaged correction value.

The disadvantage of the method as described in the above German Patent Application, there is that after the adaptation of the map, the adapted support point generally does not lie on the curve of the setpoint function curve. An exact adaptation of the support points to the setpoint function curve is therefore usually not possible in one step. Moreover, the precontrol maps described in the above German Patent Application are realized without exception as grid maps. In grid maps, the support points are positioned on the specified node points of a fixed grid dividing the input space of the map. A map adaptation cannot be performed such that the support point density is locally adaptable. With coarse quantization, the maximum map dynamic response is limited; with fine quantization, it is not possible to adapt all support points sufficiently often in seldomly approached regions under certain circumstances, and knowledge gaps arise.

SUMMARY OF THE INVENTION

The method according to the present invention having the distinguishing features of the main claim has the advantage that the map structure can be adapted very precisely to the setpoint function curve. Namely, not only the deviation to the setpoint function curve is determined, but additionally the position of the determined correction value is taken into account. Moreover, the determined correction value is assigned not only to one support point, but the determined correction value is distributed over several support points adjacent to the correction value. In this manner, the map is adapted equally and immediately in a larger region to the setpoint function curve. During later interpolation of the map value on the position of the correction value, the previously computed correction value is determined exactly.

Due to the fact that the map is not designed as a grid map, it is possible in particular to enter a correction at the site of its arisal. Moreover, it is advantageous that with the method according to the present invention, a fast, detailed and reliable map adaptation of even multidimensional maps is possible. In the method according to the present invention, the problem of the oscillatory inclination (tendency to oscillate), as can arise in the map adaptation of grid maps, is also avoided.

Using the method according to the present invention, it is also advantageous that in the map adaptation through changing existing support points those support points are corrected that would be used also for interpolation of a map value at the position of the correction value. In this manner, it becomes possible to draw upon the inverse interpolation rule for the computation of the individual corrections of the interpolation support points.

It is also advantageous that for interpolation of a map value at the position of a working point of the process, a certain number of the nearest adjacent support points to the working point are drawn upon. This principle is also applied in grid maps and has the advantage that the interpolation result exhibits the maximum accuracy. For multidimensional maps, it is advantageous to have the specific number of the support points correspond to the dimension of the map. The computing expense for the interpolation is kept low in this manner.

Moreover, it is advantageous that the map adaptation is performed only in stationary operating phases. In such case the correction data records represent the process behavior to be simulated in the map. The stationary operating phase can be recognized very simply in that the working point for a specific minimum number of map accesses remains within a limited region of the map. To keep the computing expense low, it is then useful again if the limited region is formed by the interpolation support point group of the current working point.

It is also advantageous to have the stationary operating phase being recognized in that the working point stays in two adjacent limited regions of the map. Namely, in a stationary operating phase, the working point can fluctuate back and forth between two adjacent regions.

The map adaptation can be performed advantageously at the end of the stationary operating phase. The end of the stationary operating phase can be recognized simply in that the working point leaves this region, after the minimum number of map accesses within the limited map region. However, it is also possible to recognize the end of the stationary operating phase in that the working point leaves these regions, after the minimum number of map accesses within the two adjacent limited regions.

Furthermore, it is advantageous for the map adaptation that for each map access of a stationary operating phase, the correction values are computed for the map and that the correction values determined during a stationary operating phase are combined into a single representative correction value. This measure also serves to reduce the computing load on the control unit that implements the method according to the present invention. The combining can take place by averaging the individual determined correction values in the stationary phase. Another possibility for the combining involves filtering, in particular, low-pass filtering of the determined correction values.

Moreover, it is advantageous that a specific number of correction values are ignored at the start of a stationary operating phase in the combining. This serves to suppress systematic corruptions, e.g., through after-effects of the dynamic operation (process dynamic response) at the start of the stationary phase.

Moreover, it is advantageous that in changing map values of specific support points present in the map, those support points are corrected to represent the interpolation support point group for the representative correction value. This also simplifies the adaptation process. A costly search for the support points suited to the correction does not have to take place first. For distance-weighted adaptation, an advantageous rule can be used effectively in particular also for multidimensional maps.

An advantageous correction criterion according to the present invention consists in that the absolute value of the respectively determined correction values is compared with a specified limit value and that the changing of map values of the specific existing support points is then no longer possible if the absolute value exceeds the specified limit value. For the case in which the absolute value exceeds the specified limit value, it is then advantageous that the support point density in a region of the map surrounding the representative correction value is enlarged by displacing surrounding support points in the direction of the representative correction value. The risk of incorrect adaptations decreases as a result. For the case of sensor drifts in motor vehicle applications, this measure is useful. Sensors can also be used that are more cost-effective because they have, e.g., greater drift speeds.

Moreover, it is advantageous that in the adaptation of the map by adding a new support point, the new support point is entered at the position of the representative correction value into the map. As a result, the expense of an extrapolation of the correction value to surrounding support points is eliminated. The correction value can be entered exactly into the map. For the case in which, in order to not exceed a specified memory requirement with regard to the addition of a new support point an existing support point must also be deleted, it is advantageous to delete the support point having the minimum information content. Thus, the information content of a support point can be determined advantageously through the absolute value of the error that arises for omission of the support point and interpolation at its position. Moreover, it is advantageous that in case the representative correction value lies in the immediate vicinity of an already existing support point, no new support point is entered, but rather the existing one is replaced.

Also, even if the local map gradient would change very sharply through entry of the correction value as a new support point, i.e., if the ratio of correction height to the distance to the nearest-lying support point exceeds a specified value, the nearest-lying support point is corrected since it probably has an incorrect value. It is also very advantageous if the nearest-lying support point is taken into account in the adaptation of the map to determine whether the determined correction values exhibit a common tendency, and if this is the case, an additive and/or multiplicative correction parameter is determined which is offset during later map accesses with the read-out map value. In this manner, influences that alter the entire map or larger regions in the same manner additively or multiplicatively, are recognized and can be compensated quickly and separately. Here, it is also advantageous if the additive correction parameter is determined only from correction values that were formed in regions of the map in which the map values do not exceed a specific upper limit. In these regions, the additive influence of interference is very large. Analogously, it is advantageous if the multiplicative correction parameter is determined only from correction values that were formed in regions of the map in which the map values do not fall below a specific lower limit. It has been shown, that in these regions the influence of multiplicative interference is very large.

DETAILED DESCRIPTION OF THE INVENTION

Figure 1:
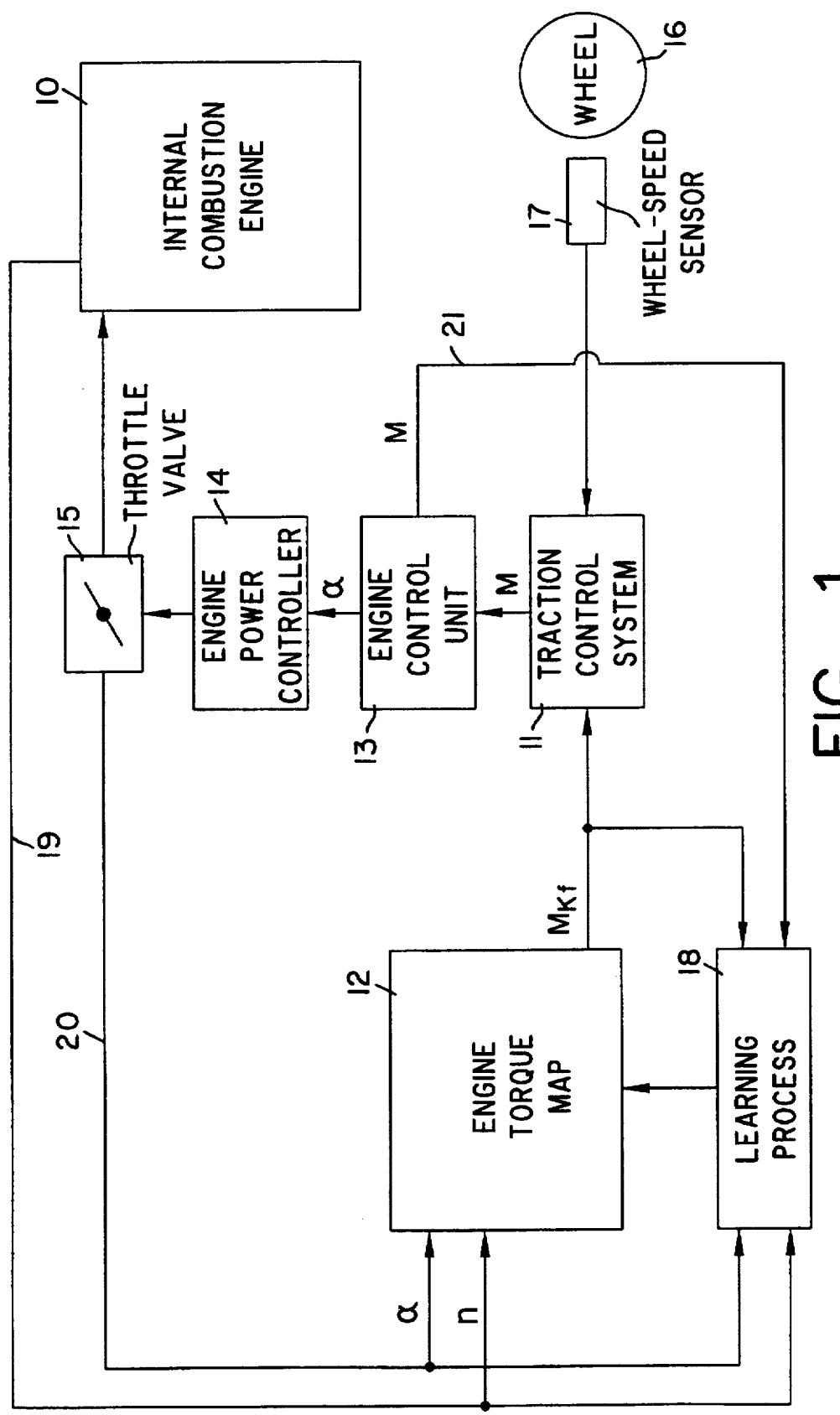
FIG. 1 shows a representation of an ASR traction control system having a map precontrol according to the present invention.

The present invention is described in the example of an ASR traction control system for a motor vehicle. The traction control system according to the present invention is shown in FIG. 1. Reference number 10 is used to designate the internal combustion engine of the motor vehicle. Reference number 11 designates the traction control system (ASR control unit). An engine control unit 13 is connected to this. Moreover, the engine control unit 13 is connected to an engine power controller 14. The reference number 15 designates the throttle valve of the internal combustion engine. Wheel-speed sensors 17 are connected to the ASR control unit 11. In FIG. 1 only one wheel-speed sensor 17 is shown. Reference number 12 is used to designate an engine torque map. Finally, reference number 18 designates a learning process by way of which the map 12 can be adapted to changed operating conditions.

The method of operation of the traction control system according to the present invention as shown in FIG. 1 is explained hereafter. The traction control system 11 monitors during its operation the wheel-speed sensors 17 to determine whether a slip is possibly present in a wheel. If too great of a slip is present in one of the wheels, a dangerous driving condition could occur in which the vehicle is no longer controllable. For this reason, the traction control system 11 should in such a case decrease the engine torque if possible so that the torque on the wheels becomes smaller and the slip on the wheel 16 abates. In order to achieve this, the traction control system 11 reads the current engine torque out of the engine torque map 12. For this purpose, the current throttle-valve angle α is fed via the line 20 as input information into the map 12. Via the line 19, the current engine speed n is fed to the engine torque map 12 as input information. The two input quantities determine the working point of the internal combustion engine 10. From the engine torque map 12, the associated engine torque value $M_{Kf}$ is then read out and fed to the traction control system 11. Based on the two pieces of input information, current engine torque $M_{Kf}$ as well as the magnitude of the slip of the wheel 16, the traction control system 11 computes a setpoint value for the engine torque $M_{soll}$. The setpoint value for the engine torque $M_{Soll}$ is fed to the engine control unit 13. The engine control unit 13 computes from this a setpoint value for the throttle-valve angle $α_{Soll}$. The computation of this setpoint value can take place possibly with the aid of a map. However, this part of the traction control system shall not be considered in greater detail here, and accordingly, is not examined in greater detail hereafter. The setpoint value for the throttle-valve angle $α_{Soll}$ is finally made available to the engine power control unit 14. This then sets the throttle-valve angle of the throttle valve 15 according to the input. Due to the setting of the throttle valve 15, the engine torque of the internal combustion engine 10 changes. If, following this control procedure, there is no longer any slip present in one of the wheels, the throttle valve can be slowly opened again according to the input of the driver in order to conform to the driver's wish. If there is still slip present in the wheels, then the throttle valve 15 must be further closed during the next control cycle.

The engine control unit 13 computes additionally the actual instantaneous value $M_{Ist}$ of the current engine torque. This value is yielded together with the existing information about the engine speed and throttle-valve position from the actually present engine load that the engine control unit 13 also determines by evaluating sensor signals. The instantaneous value of the engine torque $M_{Ist}$ is fed to the learning process 18. Likewise, the current engine torque value $M_{Kf}$ read out of the map 12 and the current throttle-valve angle α and the current engine speed n are fed to the learning process 18. From the difference between the actual instantaneous value of the engine torque $M_{Ist}$ and the value read out of the map for the engine torque $M_{Kf}$ a correction value for the engine torque map 12 can be computed via the learning process 18, so that the engine torque map can be adapted to changed process conditions. Such changed process conditions have their origin, e.g., in manifestations of wear in the internal combustion engine as well as also in manufacturing tolerances. Since, referred to the cycle time of the control unit, these changes are slow to occur, the learning process 18 is designed such that it does not write correction values into the map 12 for each control cycle, but rather the correction values are averaged over a longer time frame and then the averaged correction value is entered into the map. This is also important since the supplied input quantities such as the actual instantaneous value of the engine torque $M_{Ist}$ can be plagued with interference. Such interference requires longer statistical observation and evaluation to be eliminated. For this reason, it also does not make sense to use the instantaneous value of the engine torque $M_{Ist}$ determined by the engine control unit 13 directly as an input quantity for the traction control system 11.

Figure 2:
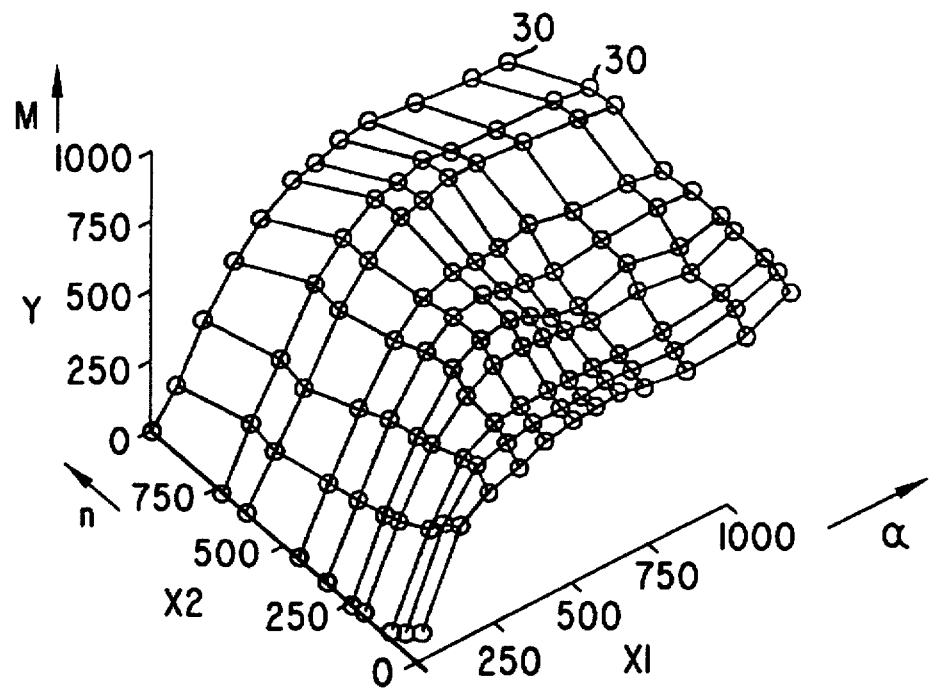
FIG. 2 shows a two-dimensional grid map according to the present invention.

FIG. 2 shows a typical engine torque map. This map is represented by 120 support points 30. The support point distribution of the map corresponds to that of a typical grid map. Here, the input space of the map (in this case fixed or formed by the speed axes and the axis for the throttle-valve angle α) is divided by a fixedly specified grid. In the node points of the grid, the support points are then positioned in each case.

Figure 3:
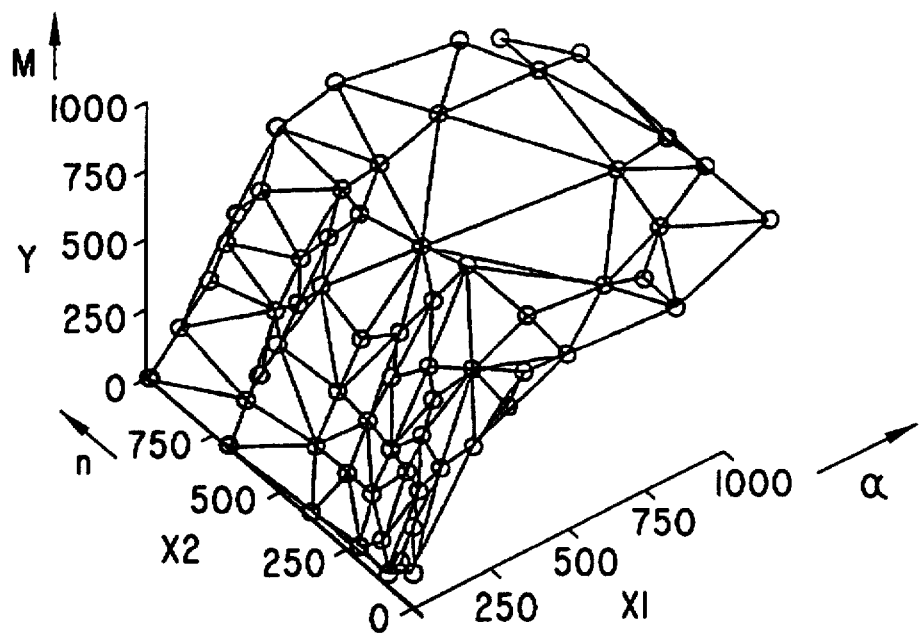
FIG. 3 shows an associative map of the two-dimensional grid map as illustrated in FIG. 2.

However, such grid maps are not used in the present invention. Instead, a so-called associative map is used. FIG. 3 shows an example of such a map. In FIG. 3, the same map as is also shown in FIG. 2 is to be represented by the support points present there. Unlike the grid map shown in FIG. 2, the support points in the associative map shown in FIG. 3 are distributed arbitrarily in the input space of the map. In order to simulate the map with the same accuracy as in the map in FIG. 2, only 64 support points are needed for the associative map. This is due to the fact that one can choose a very high support point density in the regions of high map dynamic response, whereas a very low support point density can be chosen in the map regions of only low map dynamic response. The salient features of the associative map as well as, in particular, possible access mechanisms to the support points of the associative map are described in the report M. Schmitt, H. Tolle "Das Assoziativ-Kennfeld—Eine lernfähige Standardkomponente für Automobil-Steuergeräte", Automobiltechnische Zeitschrift 96 (1994), pp. 28–32 and in German Patent Application No. 43 04 441. Accordingly, these aspects are not considered in further detail hereafter. The learning process 18 is explained in greater detail hereafter. For the learning process, it is important to facilitate a fast, detailed and reliable adaptation of two-dimensional or multidimensional maps. Here, the deviations of the map to a changed desired function curve should be compensated in a training cycle that is as short as possible, even if the map is covered only incompletely with training values.

The determination of the learning times should take place in the largest possible intervals in order to keep the computing time load low and to be able to suppress interference.

Figure 4A:
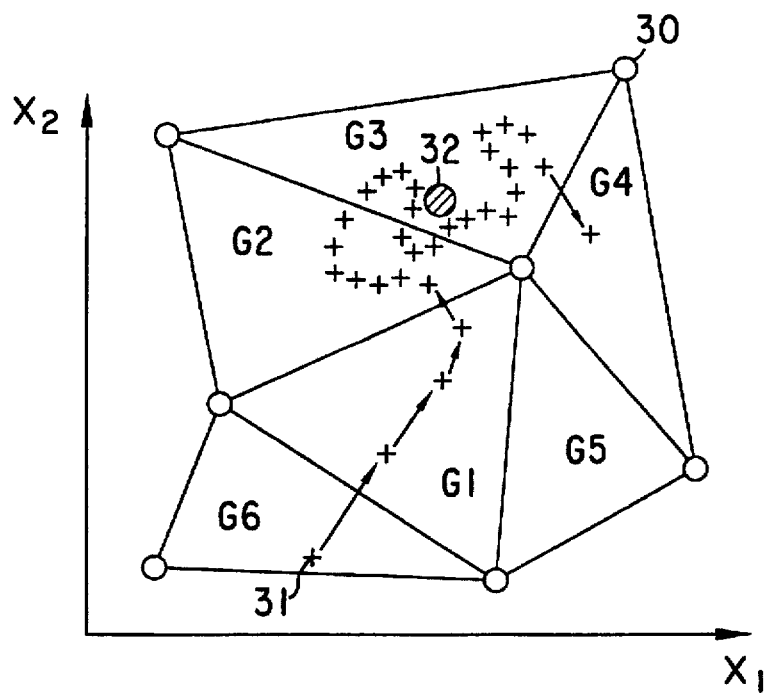
FIG. 4 shows the representation of the working point curve in stationary and dynamic operating phases of a process to be controlled.
Figure 4B:
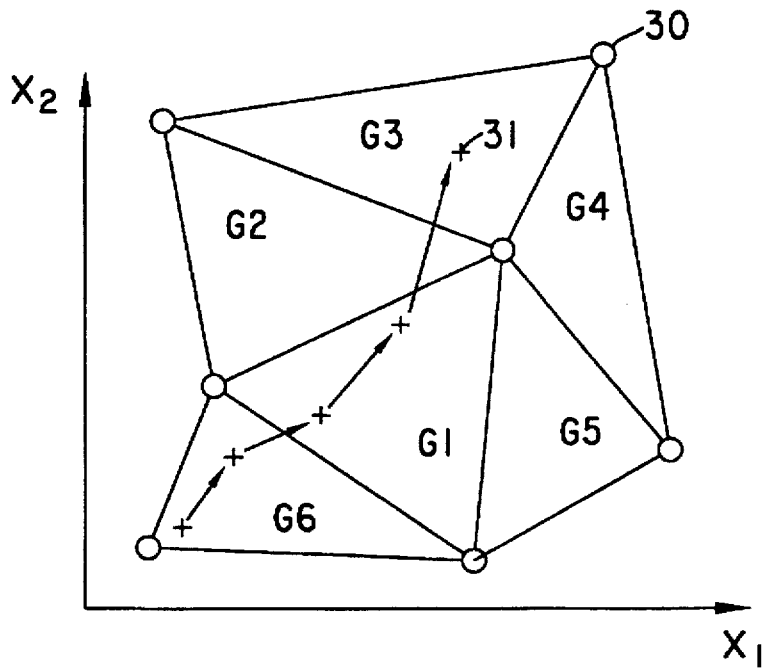

In FIG. 4a, the input space of a simple associative map is shown. The map there is represented by seven support points 30. The support points are joined together by lines such that the separated regions G1 to G6 are formed. Each region is thus formed by three support points 30. The three support points of each region simultaneously represent the interpolation support point group for the region. This means that, if the working point stays within the region, to determine the map value at the position of the working point, the three support points of the region in which the working point stays are drawn upon for interpolation of the map value. A possible curve of the working point during an operating phase of the process in which the map shown in FIG. 4a is accessed is also plotted in FIG. 4a. The represented working point curve corresponds to that of a stationary operating phase. Thus, the working point 31 stays very frequently in the region of the areas G2 and G3. In contrast, a typical working point curve for a dynamic operating phase is shown in FIG. 4b, where, the working point 31 drifts very quickly through a greater number of areas. According to the present invention, an adaptation of the map is carried out only for stationary operating states. Only then do the correction data records represent the process behavior to be simulated in the map. Since a stationary phase is characterized in that a greater number of map accesses takes place for densely adjacently-lying working points, it is used as a criterion to determine whether a stationary operating phase is present and whether sufficiently many map accesses have taken place or not within a limited region of the map. As a limited map region, the region G1 to G6 formed by the interpolation support point group is chosen. Since within a stationary phase, fluctuations of the working point 31 around the limit of two support point groups can occur, according to the present invention the stationary operating phase is also recognized in that sufficiently many map accesses have taken place within two adjacent regions G1 to G6. As an adjacency relation for interpolation support point groups, it is defined here:

two interpolation support point groups are deemed adjacent if they differ only by one support point.

As a learning time of map adaptations, the end of a stationary operating phase is chosen. The learning time is recognized in that the working point, following a minimum number of map accesses within a limited map region, leaves this region. All correction values occurring during the stationary phase are then combined into a single correction value representing the entire stationary phase. The end of the stationary operating phase is recognized in the example in FIG. 4a in that the working point drifts into the region G4 following a number of 26 map accesses within the regions G2 and G3. The correction data determined during each map access within the regions G2 and G3 are then averaged or rather filtered and combined into a correction data unit. Here, not only the individual correction values are averaged or filtered, but also the individual positions of the map accesses are averaged or filtered. In this manner, a representative correction value is computed. The position of this correction value is indicated in FIG. 4a with the reference number 32. The determined correction value 32 is entered in the associative map at the specified position, which is considered in greater detail hereafter.

If the working point drifts very quickly through the regions G1 to G6, the correction data computed in each region after the working point has left this region are discarded.

During real operation of a system in the motor vehicle, e.g., the traction control system, one must expect distorted measurement signals. The measured working point position 31 as well as the computed correction data are plagued with statistical errors and in some operating states even with systematic errors. For this reason, in the method according to the present invention a filtering of the determined individual correction values is carried out. Through the filtering, stochastic interference is to be compensated; moreover, systematic interference that occurs, for example, during the transition from a dynamic to a stationary operating phase, are to be compensated. Furthermore, as many as possible correction data records that occurred in a stationary phase are to be used for the learning process. The filter is designed preferably as a digital filter. Since the filter is called up for each map access, it is important to work towards the lowest possible computing expense here. Accordingly, for this purpose, averaging or low-pass filtering of the correction values is carried out. In order to be able to suppress stochastic interference, it must be ensured here that the stationary phase has a sufficient length so that positive and negative interference components mutually compensate one another. In the averaging, all individual correction values are weighted equally heavily. In the low-pass filtering, however, better interference suppression is achieved for only short stationary phases. To suppress systematic corruptions, e.g., through after-effects of the dynamic operation (process dynamic response), at the start of stationary phases some correction values are ignored upon entrance into a stationary phase. The number of these values must be established in an application-dependent manner.

Figure 5:
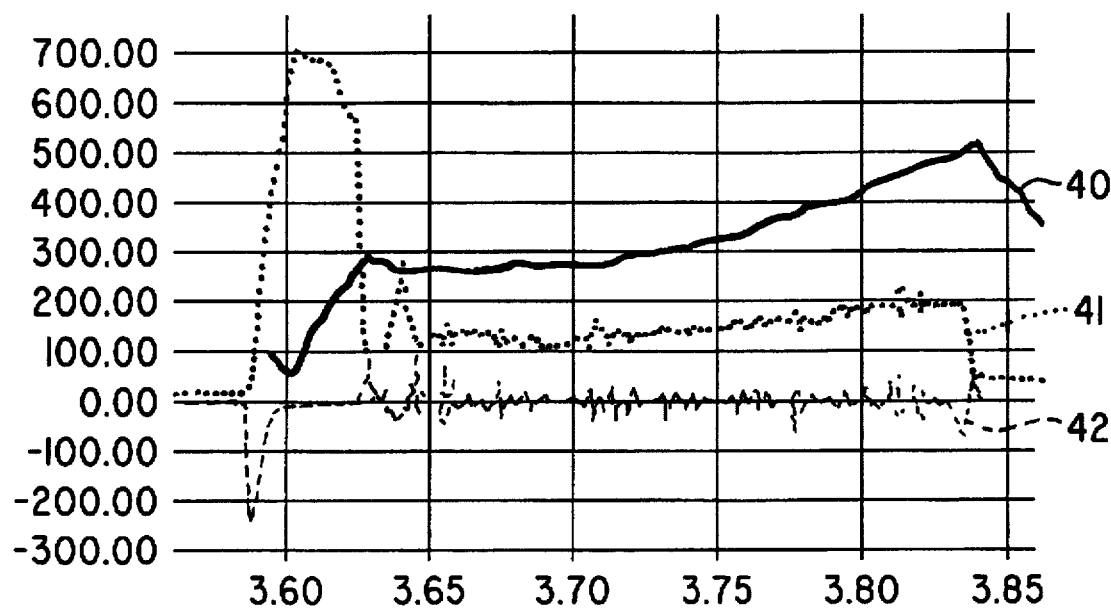
FIG. 5 shows measurement signals for the rotational speed and the throttle-valve position of an internal combustion engine during a test drive as well as the respectively determined engine torque errors for the same test drive.
Figure 6:
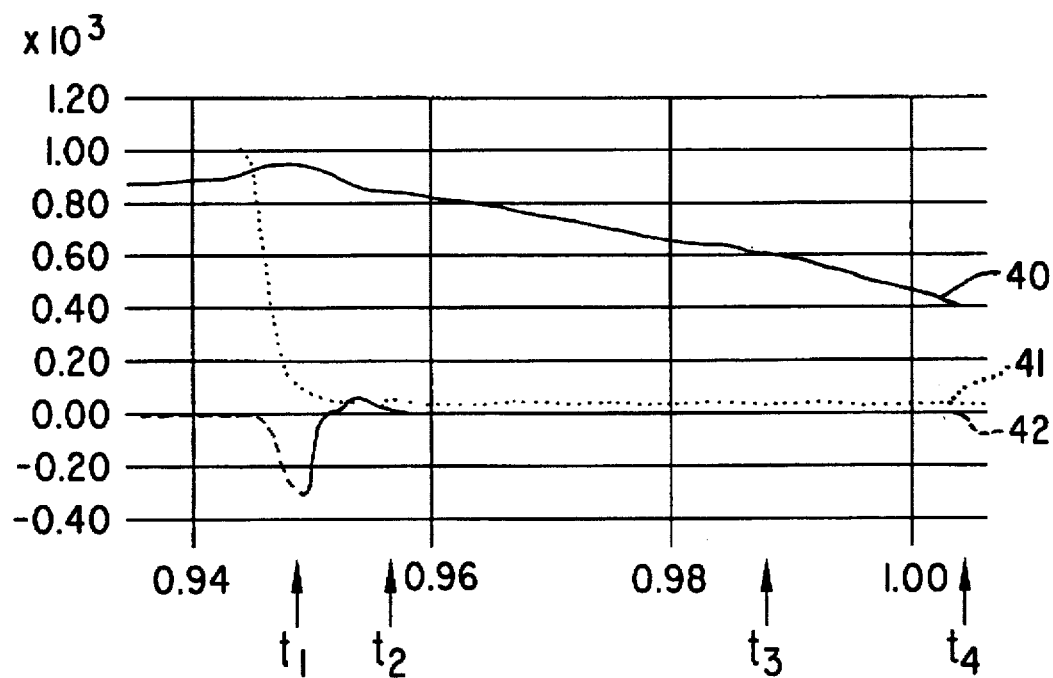
FIG. 6 shows the measurement signals for the rotational speed and the throttle-valve position of an internal combustion engine during a test drive as well as the determined engine torque errors in an enlarged view.

In FIG. 5, measurement curves plagued with interference are shown that were recorded during a test drive of a motor vehicle. Reference number 40 is used to designate the curve of the engine speed during the test drive. The curve 41 represents the curve of the position of the throttle valve during the test drive. The curve 42 indicates the error of the torque curve of the internal combustion engine. This was computed from the difference between the two quantities $M_{Kf}$ and $M_{Ist}$, determined by the traction control system. In FIG. 5, it is clear from the curves 41 and 42 that they still have interference superimposed on them. In FIG. 6, measurement curves as in FIG. 5 are also shown. However, the part shown relates to a small section of a similar test drive as in FIG. 5. The curve shown for the throttle valve makes it clear that the throttle valve is transferred suddenly from an open state to a closed state and then remains in this state for the rest of the time. The stationary operating phase begins more or less at the time t1 and ends more or less at the time t4. The time t3 represents a potential learning time. The time t2 represents the end of the influence of the dynamic after-effect on the stationary operating phase. In the time between the times t1 and t2, namely, acute torque errors are still present that, however, are not to be attributed to faulty adaptations of the map.

Figure 7:
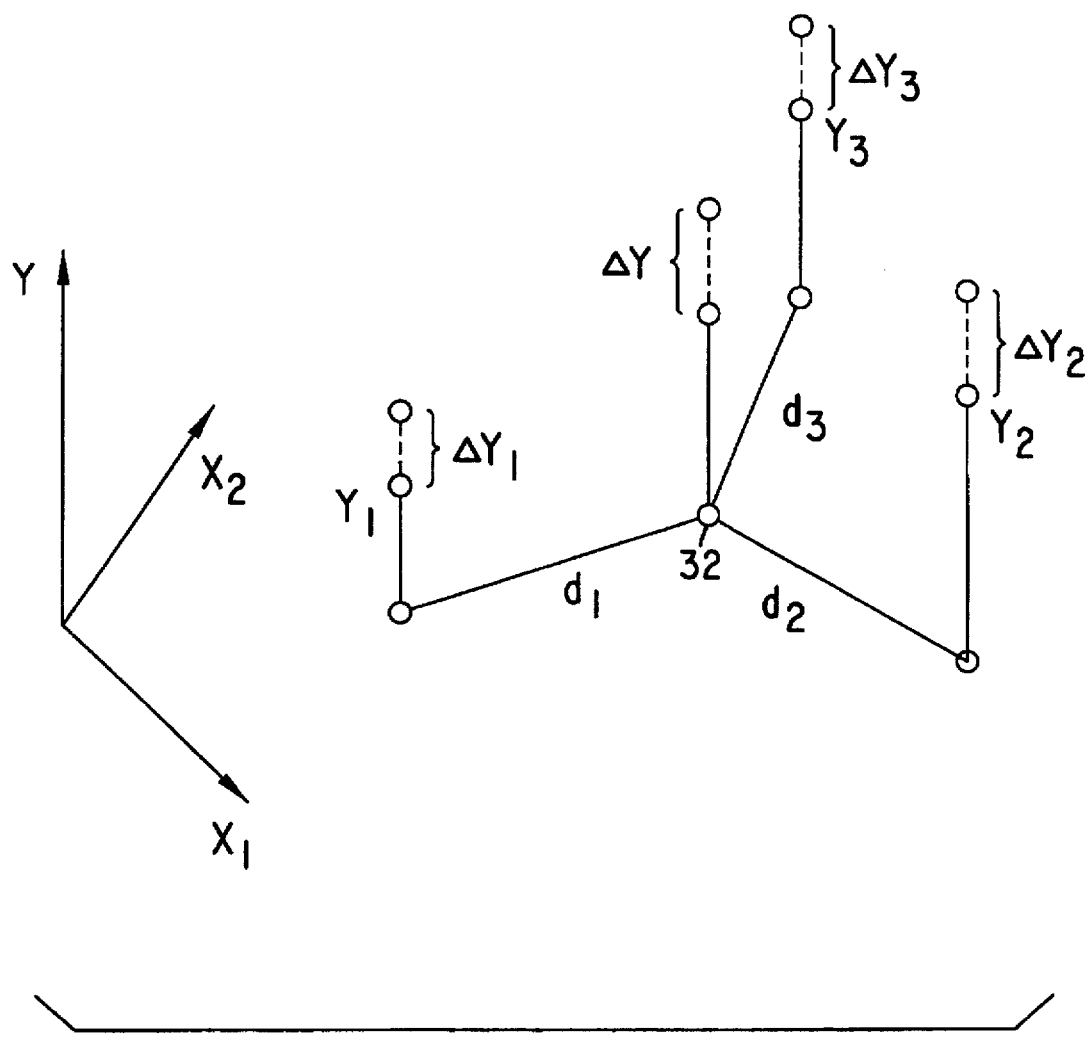
FIG. 7 shows the representation of the correction of support points of a map based on a determined correction value.

In FIG. 7, a first possibility for the entry of a correction into the map is shown. Reference number 32 is used again to designate the position of a representative correction data unit within the input space of the map. $\Delta Y_{ges}$ designates the value of the determined correction quantity for the representative correction data unit. $Y_1$, $Y_2$ and $Y_3$ are used to designate interpolation support points of the interpolation support point group for the computed correction data unit. $d_1$, $d_2$ and $d_3$ designate the distances between the position of the correction data in the input space of the map and the positions of the support points in the input space of the map, respectively. $\Delta Y_1$, $\Delta Y_2$ and $\Delta Y_3$ designate the individual correction quantities for the respective support points. If the corresponding support points are corrected by these correction quantities, an interpolation at the position 32 of the determined correction data unit would yield as an interpolation value the value of the map at this position enlarged by $\Delta Y_{ges}$. Now, however, there may be a problem for the adaptation of the map that the individual correction values for the support points $\Delta Y_1$, $\Delta Y_2$ and $\Delta Y_3$ must be determined. This as a function of the determined correction quantity $\Delta Y_{ges}$ and the distances $d_j$ between the support points to the overall correction $\Delta Y_{ges}$ since the ratio of the support point corrections is to be chosen inversely proportional to the ratio of these distances. In order to determine these individual corrections for the support points, the inverse interpolation rule is used.

It is guaranteed that the map exactly represents the correction value following the correction at this location. The rule for determining the support point corrections $\Delta Y_i$ from the overall correction $\Delta Y_{ges}$ and the distances $d_j$ of the support points to the correction value reads as follows:

$$\Delta Y_i = \gamma \delta \omega_i \Delta Y_{ges}$$

$i = 1, \ldots, n+1$ where $$\omega_i = \prod_{j=1, j \neq i}^{n+1} d_j \text{ and } \delta = \frac{\sum_{i=1}^{n+1} w_i}{\sum_{i=1}^{n+1} w_i^2}$$

with n being the dimension of the input space of the map.

The correction can be attenuated via the "learning factor" $\gamma$ in order to achieve a damped adaptation behavior.

If excessively large deviations occur in a map region that can no longer be properly compensated through correction of the support point function values of existing support points, the support point density in this region can be increased by displacing the interpolation support points according to the following rule in the direction of the correction value:

if $\Delta Y_{ges} > $ minkor $\Delta_{st} = $ inc·sign($d_i$)

Here, minkor is the minimum correction threshold below which no correction of the positions of the support points is performed. inc is the correction level to be specified by the user, e.g., between one and three increments, and sign($d_i$) is used to specify the correction polarity (the sign) in each coordinate direction. The described method according to the present invention is particularly well suited to time-critical applications in which the address space is covered only incompletely through stationary working point phases or in which certain areas are approached only seldomly in which, however, simultaneously, only limited structural changes are to be expected.

In a further elaboration of the learning process 18, an addition of new support points into the map for map adaptation is also possible. However, in order to utilize the memory range reserved for the map completely as often as possible and also to obtain the adaptability of the map following longer training, another support point is deleted prior to a new entry. For this purpose, the support point with the minimum information content $\Delta_{min}$ is chosen. Here, the information content of a support point is defined as follows: The absolute value of the error that arises for omission of a support point and interpolation at its position is a measure for the information content of this support point.

Figure 8:
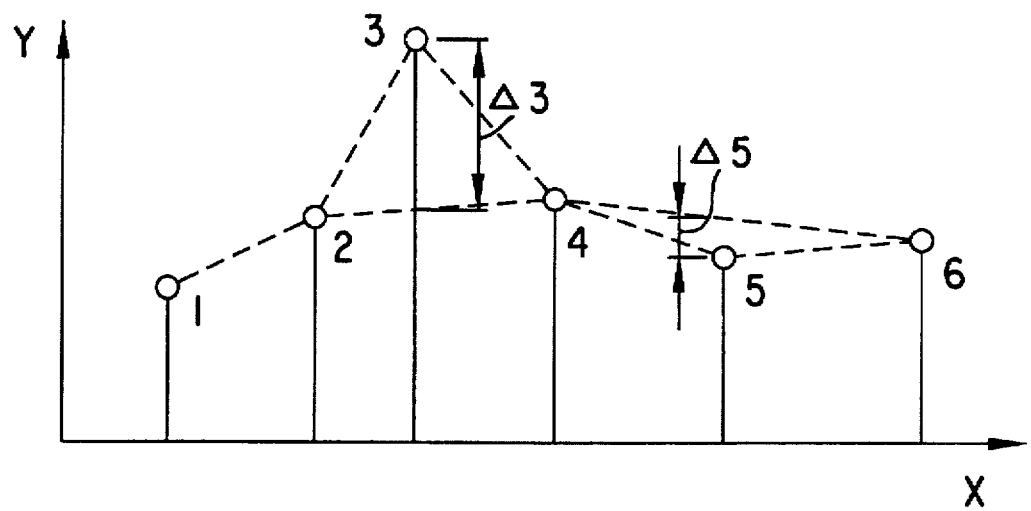
FIG. 8 shows the representation of the determination of the support point with the least information content.
Figure 9:
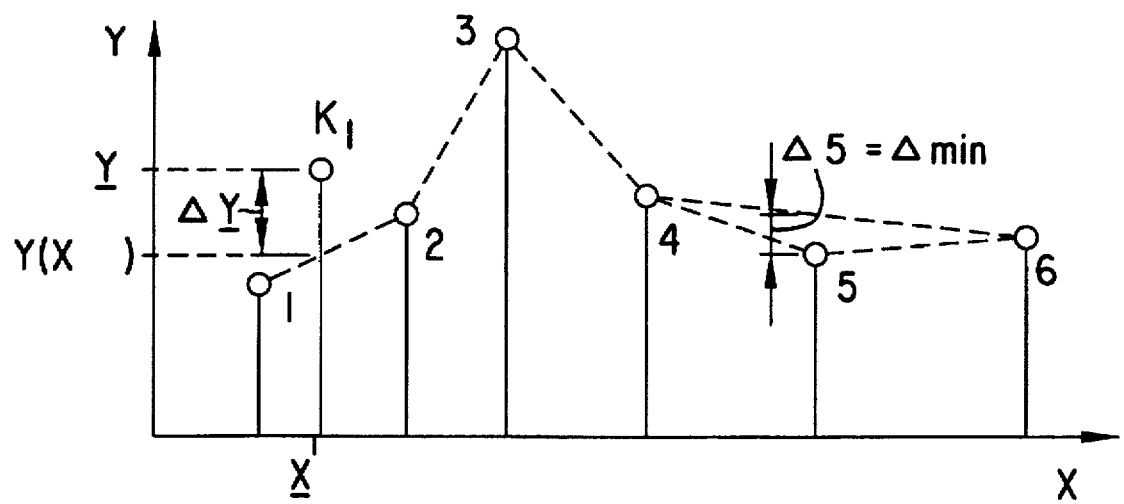
FIG. 9 shows the representation of the entry of a new support point into the simple map as illustrated in FIG. 8.

The determination of the support point with the minimum information content is shown in FIG. 8. In the example shown there, the support point 5 exhibits the minimum information content. The entry of the new support point at the position $X_{neu}$ is shown in FIG. 9.

The deleted support point is then overwritten in the memory of the corresponding control unit by the new value $Y_{neu}$ if the deviation to the value interpolated from the map at this location $Y(X_{neu}) > \Delta_{min}$.

$$|Y_{neu} - Y(X_{neu})| > \Delta_{min}$$

If the correction value ($X_{neu}$, $Y_{neu}$) occurs in the immediate vicinity of an already existing support point ($X_{alt}$, $Y_{alt}$), no new support point is entered, but rather the existing old support point is corrected according to the rule:

$$X_i^{adapt} = \beta X_i^{alt} + (1-\beta) X_i^{neu}$$

where i=1, . . . ,n $0 \leq \beta \leq 1$ $$X_i^{adapt} = \beta Y_{alt} + (1-\beta) Y_{neu}$$

The forgetting factor $\beta$ is used to specify how greatly the new correction is to change the old support point.

Even if the local map gradient would change very much through entry of the correction value as a new support point, i.e., if the ratio of correction height $\Delta Y_{neu}$ to the distance to the nearest-lying support point $d_{min}$ exceeds a specified value, the nearest-lying support point is corrected since it probably has an incorrect value. By entering new support points and the associated deletion of old support points, good adaptation is possible even for great changes in the map structure, assuming the map is sufficiently covered by stationary phases.

In particularly critical applications in which pronounced gaps exist in the working point coverage and simultaneously great structural changes occur that make it necessary to effectuate a drastic change in the support point density in the affected regions, a combination of the mentioned learning processes (correction of existing support points, displacement of existing support points, addition of new support points combined with deletion of old support points) can also be used. If the average error at the working point is still relatively large even after longer training, i.e., if the number of the entered corrections reaches a specified threshold less than or equal to the number n of the total stored support points and the error still exceeds a specified limit value, it is assumed that through the correction of existing support points, it was not possible to concentrate a sufficiently large number of support points in regions of great structural change. In this case, a transition is made to a combined method in which a new support point is entered if the correction value to be entered lies removed from the nearest-lying support point by more than a specifiable maximum distance (e.g., 10% of the normalized value range of the map addresses). This combined method is then useful if only sporadically great structural changes occur (if large structural changes occur sporadically). If, in the method in which new support points are entered into the map and old ones deleted respectively, large errors still occur following longer training, it was presumably not possible to update the map due to the incomplete working point coverage and the entry of concentrated correction values in some regions. In this case, a switch should be made to the previously explained method with the correction of existing support points in order to cover a larger map region through correction value extrapolation and distribution over multiple surrounding support points and to close knowledge gaps that arose in this manner. This combined method is then useful if constantly great structural changes occur (if large structural changes occur constantly). As soon as the average error at the working point remains below the specified error threshold for a certain period, a switch back to the original adaptation strategy can be made.

Figure 10:
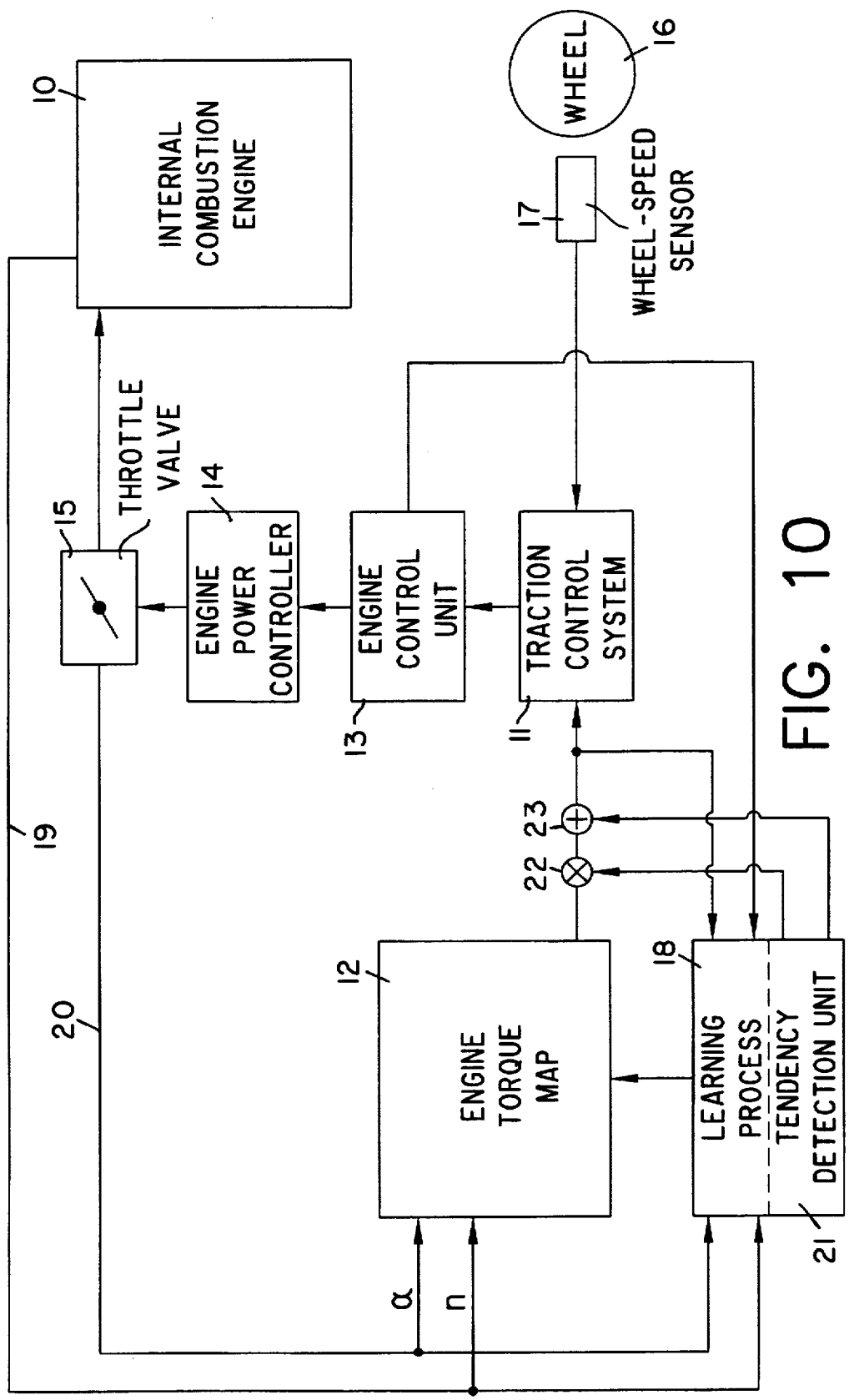
FIG. 10 shows a basic representation of a second exemplary embodiment for a traction control system according to the present invention.

In FIG. 10, a slightly modified arrangement for an ASR traction control system is shown. Here, the reference numbers from FIG. 1 designate the same components and are not explained anew. In addition to the learning process 18, a tendency detection unit 21 is also provided. The tendency detection unit 21 cooperates closely with the learning process 18. If the correction values determined for each map access exhibit a common tendency, i.e., are not average-value-free, the uniformly additively and the multiplicatively acting component is extracted by the tendency detection unit 21. The additive correction parameter $C_0$ determined in this manner and the multiplicative parameter $C_1$ are offset during the map access according to the rule $Y' = C_1 \cdot Y(X) + C_0$ with the map output value $Y(X)$.

Figure 11:
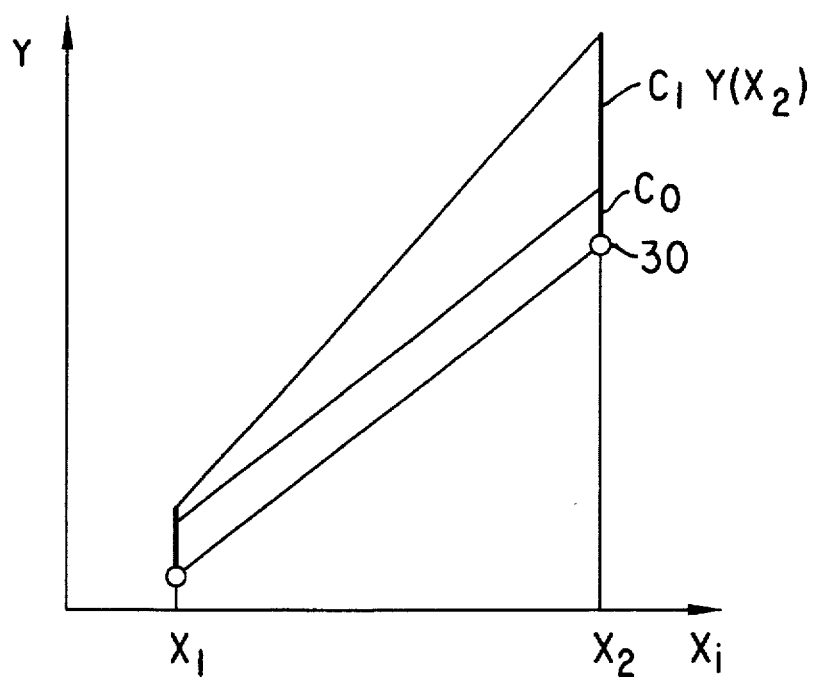
FIG. 11 shows a representation of the effects of additive and multiplicative changes on different map values with the magnitudes of the map values differing highly from one another.
Figure 12:
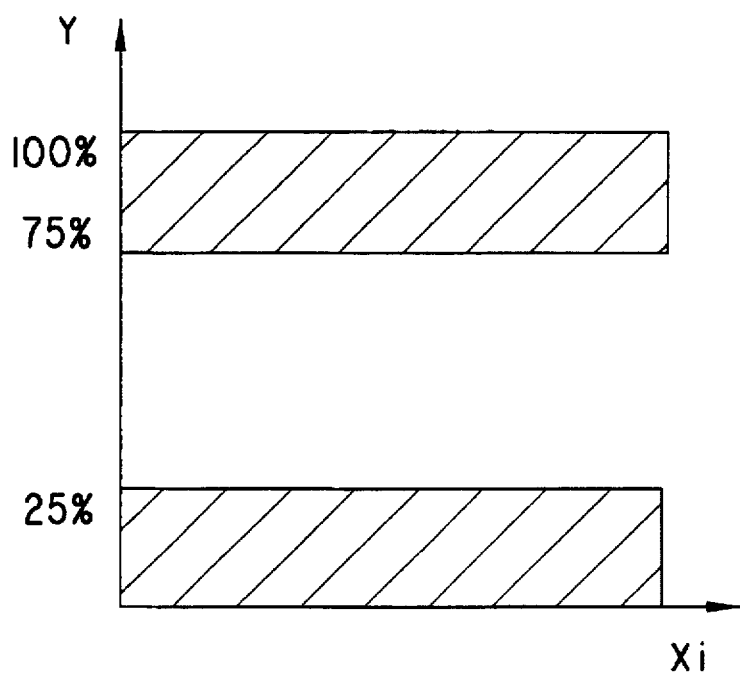
FIG. 12 shows a schematic representation of a division of the stored function values into regions in which the additive correction quantity is determined and into regions in which only the multiplicative correction quantity is determined.

In order to separate additive from multiplicative influences, the additive correction parameter can be determined only in map regions of small function values in a simple manner that makes economical use of computing time since an additive displacement has a particularly pronounced effect here. Analogously, the multiplicative correction parameter is determined only in regions of large function values. The influence of additive correction parameters and multiplicative correction parameters is shown in greater detail in FIG. 11. FIG. 12 then shows two selected shaded function value regions. The regions of the map in which the function values lie between 0 and 25% of the highest map value are used for the extraction of the additive correction parameter. The regions in which the function values lie between 75% and 100% of the highest function value of the map are used for the extraction of the multiplicative correction parameter. The adaptation rules for the correction parameters read as follows:

$$c_0(k) = c_0(k-1) + q0_{add} \Delta Y(k) + q1_{add} \Delta Y(k-1)$$

$$c_1(k) = c_1(k-1) + q0_{mult} \Delta Y(k) + q1_{mult} \Delta Y(k-1)$$

Here, the constants $q0_{add}$, $q1_{add}$, $q0_{mult}$ and $q1_{mult}$ are control parameters of a proportional-integral control algorithm. The parameters must be preselected. $\Delta Y(k-1)$ gives the deviation between setpoint value function curve and map value for a map access k−1, with $\Delta Y(k)$ corresponding to the deviation for the subsequent map access k. However, the correction parameters $c_0$ and $c_1$ of the correction rule $Y'=C_1Y(x)+C_0$ can also be computed in another manner, e.g., through a regression computation over multiple correction values $Y_{(x)i}$ or another parameter estimation method. The correction parameters should in each case be readapted after the control process is switched on. Moreover, the parameters can also be constantly updated in parallel to the structural adaptation of the map.

For this purpose, the structure learning can be interrupted occasionally and a post-adaptation of the global correction parameters performed. In applications in which even during the operation a significant change in globally active influences must be expected, the global correction parameters should instead be adapted in parallel along with the others by using a small part (e.g., 5%) of each support point correction for adaptation of the global map corrections.

The present invention is not limited to the exemplary embodiment described here. It can be used whenever maps are used for controlling or modelling a process. This is the case, for example, in injection control and also in ignition control of an internal combustion engine. However, further applications are also found, for example, in transmission control.

A variation of the described method according to the present invention also consists in that not the actual map that is read out to control the process is adapted, but rather that additionally a correction map is provided into which the correction values for the actual map (base map) are entered. The base map is thus always retained and it is possible, if so desired, to switch back later to the base map, e.g., after a certain sensor component was exchanged (operation under emergency conditions). Here, the base map can be designed as a finely subdivided grid map, whereas the correction map is designed as an associative map with only a small number of support points.

We claim:

1. A method for controlling at least one process in a motor vehicle, the motor vehicle including a control unit having an engine characteristics map, the method comprising the steps of:

forming the engine characteristics map with operating quantities of the at least one process, the engine characteristics map being represented by at least one support point being positioned at selected locations in the engine characteristics map independent of a fixed grid, each of the at least one support point corresponding to at least one respective engine characteristics value of the engine characteristics map at the selected locations of the at least one support point;

generating at least one of a control quantity and a model quantity for providing at least one of a control emission signal and a modeling emission signal;

determining the at least one engine characteristics value from the engine characteristics map as a function of at least one of the control and model quantities to obtain at least one working point of the at least one process;

adapting the engine characteristics map to a changed process behavior of the at least one process for determining a first correction value for a preselected operating phase of the at least one process;

selecting a first support amount of the at least one support point positioned near the first correction value for adapting the engine characteristics map;

calculating a second correction value for each of the selected support points as a function of the first correction value for the first support amount of the at least one support point; and adaptively distance-weighting the first support amount of the at least one support point as a function of a position of the first correction value in the engine characteristics map.

2. The method according to claim 1, wherein the at least one process includes at least one of a combustion process, a transmission switching process and a braking process.

3. The method according to claim 1, wherein the step of adapting the engine characteristics map includes selecting the at least one support point for interpolating the at least one respective engine characteristics value at the selected location of the first correction value.

4. The method according to claim 3, further comprising the step of selecting a first amount of the at least one support point positioned near the at least one working point for interpolating the at least one respective engine characteristics value, the first amount of the at least one support point being uniformly distributed around the at least one working point.

5. The method according to claim 4, wherein the first amount of the at least one support point corresponds to map dimensions of the engine characteristics map, the map dimensions corresponding to an operating amount of the operating quantities increased by 1, and further comprising the step of forming an interpolation support point group using the first amount of the nearest adjacent points of the at least one support point.

6. The method according to claim 1, wherein the step of adapting the engine characteristics map is performed only in a stationary operating phase of the at least one process.

7. The method according to claim 6, wherein the stationary operating phase is defined by maintaining the at least one working point within a limited region of the engine characteristics map for predefined minimum map accesses.

8. The method according to claim 7, wherein the limited region is formed by interpolating an interpolation support point group of the at least one working point.

9. The method according to claim 6, wherein the stationary operating phase is defined by maintaining the working point within at least two adjacent limited regions of the engine characteristics map for the predefined minimum map accesses.

10. The method according to claim 7, wherein the step of adapting the engine characteristics map is performed at a completion of the stationary operating phase.

11. The method according to claim 10, wherein the completion of the stationary operating phase is defined by removing the at least one working point from the limited region, the at least one working point being removed from the limited region after the predefined minimum map accesses in the limited region.

12. The method according to claim 9, the completion of the stationary operating phase is defined by removing the at least one working point from the two adjacent limited regions after the predefined minimum map accesses in the limited region.

13. The method according to claim 6, wherein a plurality of the first correction value is repeatedly computed for the engine characteristics map during the stationary operating phase, and wherein the plurality of the first correction value is combined to form a representative correction value.

14. The method according to claim 13, wherein the representative correction value is formed by at least one of averaging the plurality of the first correction value and averaging a respective position of each of the plurality of the first correction value being averaged.

15. The method according to claim 13, wherein the representative correction value is formed by low-pass filtering of the plurality of the first correction value.

16. The method according to claim 6, wherein a prespecified number of plurality of the first correction value are disregarded for combining at a beginning of the stationary operating phase.

17. The method according to claim 6, wherein the step of adapting the engine characteristics map includes selecting the at least one support point for forming an interpolation support point group to form a representative correction value.

18. The method according to claim 17, wherein the second correction value of the interpolation support point group of the representative correction value is determined according to:

$$\Delta Y_i = \gamma \delta \omega_i \Delta Y_{ges}$$

I=1, ..., n+1,
wherein $$\omega_i = \prod_{j=1, j \neq i}^{n+1} d_j \text{ and } \delta = \frac{\sum_{i=1}^{n+1} w_i}{\sum_{i=1}^{n+1} w_i^2},$$

γ being a learning factor,
$\Delta Y_{ges}$ being the first correction value, and
$d_j$ being distances between the at least one support point.

19. The method according to claim 1, wherein in the step of adapting the engine characteristics map, the first correction value is further determined by changing the at least one respective engine characteristics value of a predetermined amount of the at least one support point for determining if the engine characteristics map can be adapted, and wherein a support point density of the at least one support point is modified by at least one of displacing each of the at least one support point and modifying the predetermined amount of the at least one support point, the predetermined amount of the at least one support point being modified by at least one of adding the predetermined amount of additional support points and deleting the predetermined amount of the at least one support point, the support point density being modified if the engine characteristics map cannot be adapted.

20. The method according to claim 19, wherein the first correction value is provided to form at least one of an averaged absolute value and a low-pass-filtered absolute value for comparing with a predetermined limit value, the at least one respective engine characteristics value of the first support amount of the at least one support point being fixed if at least one of the averaged and low-pass-filtered absolute values exceeds the specified limit value.

21. The method according to claim 20, wherein the support point density in a region of the first correction value is increased by displacing the at least one support point of a interpolation support point group formed by the at least one support point, the at least one support point being displaced in a direction of a first correction value when the absolute value exceeds the specified limit value.

22. The method according to claim 21, wherein the at least one support point include displacements of the interpolation support point group of the first correction value, the displacements being calculated according to:

$$\Delta_{xi} = \text{inc sign}(d_i),$$

wherein $d_i$ is a correction polarity.

23. The method according to claim 21, wherein the additional support points are generated at the corrective position of the first correction value in the engine characteristics map.

24. The method according to claim 19, wherein the predetermined amount of the at least one support point having a minimum information content is selected for being deleted.

25. The method according to claim 24, wherein the minimum information content is determined using an absolute error value obtained when at least one of omitting the at least one support point and interpolating one the predetermined locations of the at least one support point.

26. The method according to claim 24, wherein the predetermined amount of the at least one support point is modified only if the predetermined amount of the additional support points being added is greater than the predetermined amount of the support point being deleted.

27. The method according to claims 23, wherein the first correction value is positioned closer to one of the at least one support point, the first correction value being positioned closer than a predetermined minimum distance, the predetermined amount of the at least one support point not being added, the at least one support point including existing support points being adapted according to:

$$X_i^{adapt} = \beta X_i^{alt} + (1-\beta) X_i^{neu}$$

where I=1, ..., n  $0 \leq \beta \leq 1$ $$X_i^{adapt} = \beta Y_{alt} + (1-\beta) Y_{neu},$$

wherein β is a forgetting factor, and $X_i^{alt}$, $Y_{alt}$, $X_i^{neu}$ and $Y_{neu}$ are the existing support points.

28. The method according to claim 27, wherein nearest-lying one of the at least one support point is corrected and another one of the at least one support point is not entered at the position of the first correction value when a ratio of the first correction value to the minimum distance to the nearest-lying one of the at least one support point exceeds a specified value.

29. The method according to claim 1, wherein the step of adapting the engine characteristics map includes determining if a plurality of the first correction value produces a common tendency, and determining at least one of an additive correction parameter and a multiplicative correction parameter being offset with a read-out map value during later map accesses.

30. The method according to claim 29, wherein the additive correction parameter is determined only from the plurality of the first correction value being formed in regions of the engine characteristics map in which an absolute value of the read-out map value is formed below a predefined upper limit.

31. The method according to claim 30, wherein the multiplicative correction parameter is determined only from the plurality of the first correction value being formed in the regions of the engine characteristics map in which the absolute value of the read-out map value is formed above a predefined lower limit.

32. The method according to claim 31, wherein the additive correction parameter is determined according to:

$$c_0(k) = c_0(k-1) + q0_{add} \Delta Y(k) + q1_{add} \Delta Y(k-1),$$

wherein $q0_{add}$ and $q1_{add}$ are control parameter constants of a proportional integral control algorithm, and ΔY(k) and ΔY(k-1) are deviations for map accesses.

33. The method according to claim 31, wherein the multiplicative correction parameter is determined according to:

$$c_1(k) = c_1(k-1) + q0_{mult} \Delta Y(k) + q1_{mult} \Delta Y(k-1),$$

wherein $q0_{mult}$ and $q1_{mult}$ are control parameter constants of a proportional integral control algorithm, and ΔY(k) and ΔY(k-1) are the deviations for map accesses.

* * * * *

UNITED STATES PATENT AND TRADEMARK OFFICE
CERTIFICATE OF CORRECTION

PATENT No. : 5,713,332

DATED : Feb. 3, 1998

INVENTOR(S): Walter Adler, Manfred Schmitt, Henning Tolle, Thorsten Ulrich

It is certified that error appears in the above-identified patent and that said Letters Patent is hereby corrected as shown below:

Column 2, line 49, "However, it" should be --It--;

Column 6, lines 14-15, "lernf ähige" should be --lernfähige--;

Column 9, line 30, insert -- |-- after "neu)"; and

Column 12, line 66, "6," should be --5,--.

Signed and Sealed this

Fourteenth Day of September, 1999

Attest:

Q. TODD DICKINSON

*Attesting Officer*　　　*Acting Commissioner of Patents and Trademarks*